United States Patent [19]

Vetter

[11] 4,202,379
[45] May 13, 1980

[54] SEALING ARRANGEMENT

[76] Inventor: Manfred Vetter, Burg Langendorf, 5352 Zülpich, Fed. Rep. of Germany

[21] Appl. No.: 947,748

[22] Filed: Oct. 2, 1978

[30] Foreign Application Priority Data

Oct. 10, 1977 [DE] Fed. Rep. of Germany ....... 2745506

[51] Int. Cl.² ............................................. F16L 55/16
[52] U.S. Cl. ...................................... 138/99; 138/97
[58] Field of Search ................... 138/97, 99; 128/118, 128/462; 220/232; 285/15; 264/36; 24/21, 22

[56] References Cited

U.S. PATENT DOCUMENTS

| | | | |
|---|---|---|---|
| 326,012 | 9/1885 | Brooks | 138/99 |
| 712,019 | 10/1902 | Thomas et al. | 138/99 |
| 2,127,456 | 8/1938 | Adams | 138/99 |
| 2,278,714 | 4/1942 | Stauffer | 138/99 |
| 3,480,043 | 11/1969 | Proudfoot et al. | 138/99 |
| 3,496,963 | 2/1970 | Bardgette et al. | 138/99 |
| 4,083,087 | 4/1978 | Hale | 138/99 X |

*Primary Examiner*—Richard E. Aegerter
*Assistant Examiner*—James E. Bryant, III
*Attorney, Agent, or Firm*—Michael J. Striker

[57] ABSTRACT

A sealing arrangement used to quickly seal leaks in pipes and the like is of the type comprising an inflatable pad which is laid against the leaking pipe surface, a counterpressure element which presses the inflatable pad against such surface and to which holding belts or the like wrapped around the pipe or the like can be connected and tightened prior to inflation of the inflatable pad. The counterpressure element does not have the form of a conventional rigid counterpressure plate but instead is a flexible counterpressure pad, whereby the inflatable pad and the counterpressure pad can very completely conform to the leaking surface to be sealed. The counterpressure pad comprises embedded reinforcements, including transverse reinforcements at its edge regions extending transverse to the direction in which the counterpressure pad tends to be pulled when held in place by the tightened holding belts with the inflatable pad inflated, and also longitudinal reinforcements in the form of steel cords which are slung around the transverse reinforcements and extend generally perpendicular thereto. Because the counterpressure pad can conform to the surface to be sealed, the displacement performed by the inflatable pad upon inflation is relatively limited and therefore the inflatable pad can be of very sturdy construction and does not uncontrollably or locally expand upon inflation.

16 Claims, 6 Drawing Figures

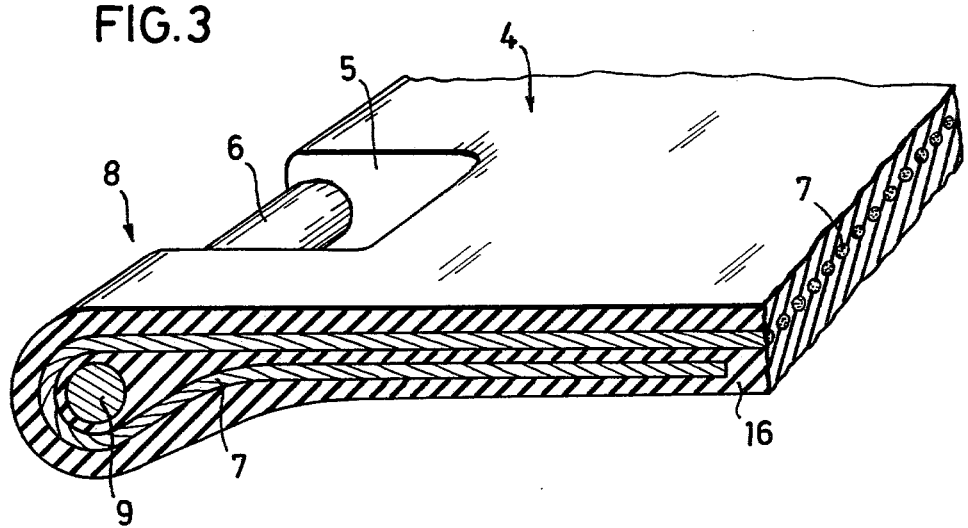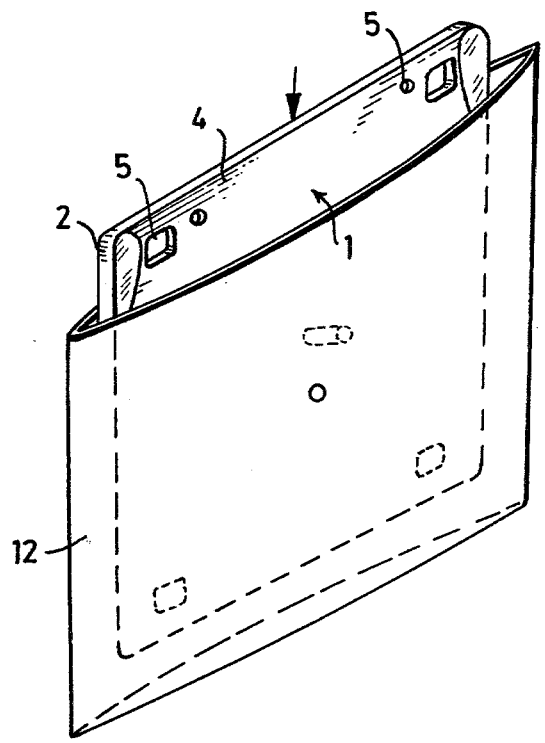

SEALING ARRANGEMENT

BACKGROUND OF THE INVENTION

The present invention concerns sealing arrangements of the type typically used to seal a leak in a pipe, conduit, container, vessel, or the like. Typically, such sealing arrangements comprise an inflatable pad which is laid upon the leaking surface of the pipe, or the like. The inflatable pad is held in place by a counterpressure plate to which are connected tightened belts or cables which are wrapped around the leaking pipe. Sealing arrangements of this type are often used to stop seals in damaged pipes or conduits in a simple, fast and inexpensive manner, particularly temporarily. Such sealing arrangements are often used to seal off a leak in a pipe carrying an environmentally dangerous liquid or gas, so as to stop the escape of such fluid as quickly as possible, in order to prevent explosive hazards or environmental pollution.

Federal Republic of Germany Gebrauchsmuster DT-GM 1,920,243 discloses a sealing arrangement of the type in question. With that arrangement, a flexible sealing pad is laid against the leaking surface, and an inflatable pad is inserted between the sealing pad and a counterpressure plate provided with eyes for the attachment of tightened holding belts or holding cables. With that known arrangement, the counterpressure plate is entirely rigid, and this greatly limits the applicability of a sealing arrangement of given size and thickness to pipes, conduits, vessels and the like of varying size. Especially when the leaking surface is the very curved surface of a small-diameter pipe or vessel, experience has shown that reliable sealing off of the leak may not be possible with the requisite degree of quickness and reliability.

SUMMARY OF THE INVENTION

It is a general object of the present invention to provide a sealing arrangement of the type in question not exhibiting the problems referred to above.

It is another object to provide a sealing arrangement which can always be quickly and reliably installed in a great variety of spatial situations, e.g., with pipes of markedly different diameters located in cramped spaces and so forth.

It is a further object to provide a sealing arrangement which is of very robust construction, does not consume an unnecessary amount of space and can be readily stored.

Most importantly is an object of the invention to provide a sealing arrangement which can seal off a leak in a surface even if the surface is markedly non-planar and even if the leak extends across a sizable area of such surface.

According to the present invention, these objects can be achieved by using, instead of the rigid counterpressure plate of the prior art, a flexible counterpressure pad. This has the great advantage that the sealing arrangement, and in particular the counterpressure pad can be very easily and completely conformed to the curvature of the leaking surface of the pipe, conduit, container or vessel to be sealed. In particular, because the shape of the flexible counterpressure pad conforms very completely to the leaking surface, the inflatable pad will when expanded inflate very uniformly, i.e., maintaining its generally pad-like shape. Because the inflatable pad when inflated retains its pad-like character, it need not be greatly elastic and therefore can be of very robust material and construction. Furthermore, because the inflation of the inflatable pad involves only a relatively small amount of displacement of the walls of the inflatable pad, the amount of air needed for inflation is likewisely relatively small, which is important when extremely fast sealing off of a leak is required. Additionally, because the flexible counterpressure pad conforms so completely to the shape of the leaking surface, this assures that when the inflatable pad is inflated the latter will reliably maintain its initial position, e.g., will not slip. In particular, the sealing arrangement of the present invention makes it possible to seal off leaks which span around large circumferential sectors of a pipe.

The sealing arrangement of the present invention is easily stored, because it is flexible. Because of the high mechanical strength of the inflatable pad, it is possible for many applications to dispense with the usual pliant sealing pad between the inflatable pad and the leaking surface to be sealed.

According to a preferred concept of the invention, the flexible counterpressure pad is provided with transverse edge reinforcements and accommodates reinforcing elements such as steel cords which are slung around the edge reinforcements and extend, within the material of the counterpressure pad, generally perpendicular to the edge reinforcements, i.e., generally parallel to the direction in which the flexible counterpressure pad would tend to elongate under the action of the tightened holding belts or holding cables. This prevents longitudinal stretching of the flexible counterpressure pad. Preferably, the counterpressure pad is provided with eyes, to which hooks or the like on the holding belts are connected, located inwardly of the transverse reinforcements, so that when the holding belts are tightened the eyes of the counterpressure pad cannot be torn off, i.e., because the longitudinally extending reinforcements are slung about the transverse reinforcement at the edge region of the counterpressure pad.

Because of the flexibility of the counterpressure pad, the inflatable pad can be of relatively simple construction. Because the counterpressure pad, which applies holding force to the inflatable pad, closely conforms to the leaking surface to be sealed, localized excessive expansion of the inflatable pad, for example in the central or peripheral regions of the inflatable pad, is avoided. Likewise, because the walls of the inflatable pad do not have to be displaced a great distance upon inflation, there is very much less of a tendency for the displaced walls of the inflated pad to inwardly collapse the leaking surface to be sealed. The inflatable pad acts very much like a very stiff spring having only a small range of spring displacement.

In the preferred embodiment of the invention, the counterpressure pad is rectangular and its narrow ends are provided with transverse reinforcements in the form of metal bars. Such a construction is particularly well suited to stopping leaks in cylindrical pipes. The flexible counterpressure and inflatable pads can be wrapped around a large sector of the circumference of the pipe in the manner of an inflatable cuff. With this design for the flexible counterpressure pad, the reinforcements are particularly simple and inexpensive to provide.

According to a further concept of the invention the inward surface of the inflatable pad, i.e., the surface which faces towards the leaking surface to be sealed, is provided with a sealing pad made of foam rubber connected to the inflatable pad releasably by means of snap action pressure connectors, Velcro connectors, or the like. Such a soft rubber sealing pad is advantageous when the leaking surface is not merely curved but furthermore uneven, and also it makes possible the sealing of leaking pipe joints which could not be sealed using the inflatable pad alone because of the inability of the surface of the inflatable pad to fully conform to the surfaces involved. Advantageously the surface of the foam rubber sealing pad which faces towards the surface to be sealed is covered over by a continuous skin of foam rubber material for protective purposes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a perspective, sectioned view of the counterpressure pad of FIG. 1;

FIG. 4 is a perspective view showing the counterpressure and inflatable pads of the arrangement inserted into an envelope of chemically resistant foil material;

DESCRIPTION OF THE PREFERRED EMBODIMENTS

Figure 1:
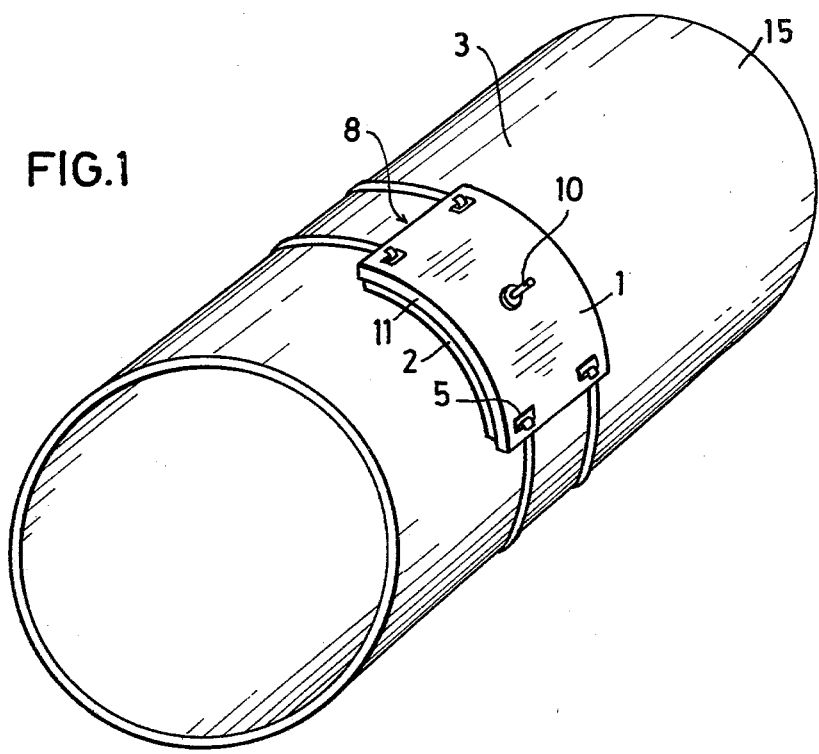
FIG. 1 is a perspective view of a sealing arrangement embodying the present invention, wrapped around a leaking pipe.
Figure 2:
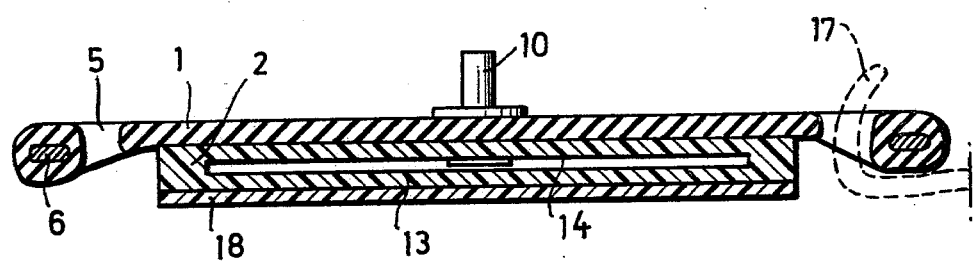
FIG. 2 is a longitudinal section through the sealing arrangement of FIG. 1.

The sealing arrangement depicted in FIGS. 1 and 2 comprises a counterpressure pad 1 made of for example synthetic rubber and an inflatable pad 2 likewise mad of rubber and permanently connected to the counterpressure pad 1 at the interface between the two pads. The counterpressure pad is rectangular and is provided at its shorter sides 8 with eyes 5. Hooked into the eyes 5 are the hooks 17 of a pair of holding belts, e.g., so-called polybelts which can be tightened around a leaking pipe 15, with the inflatable pad 2 uninflated, by means of a (non-illustrated) ratchet arrangement or other conventional tightening arrangement. The leak or break covered by the pads 1, 2 can then be sealed off by sufficiently inflating the inflatable pad 2. To this end, the inflatable pad 2 is provided with an inflation valve 10 which extends through an aperture in the center of counterpressure pad 1 so as to be exteriorly accessible. The inflation valve 10, can, for example, be of the type with which vehicle tires are conventionally provided, i.e., normally acting as a check valve but having a central pin which when depressed permits deflation.

Figure 6:
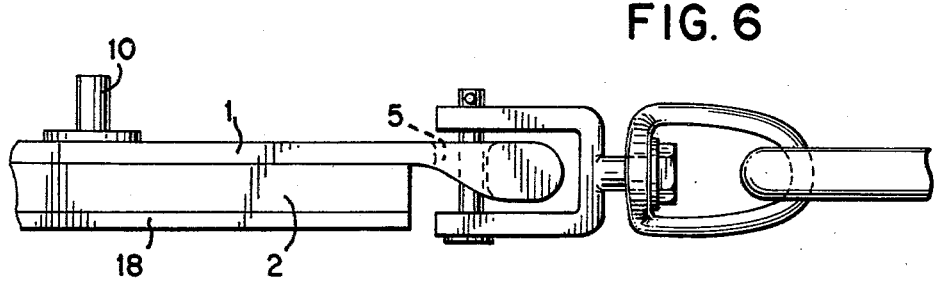
FIG. 6 depicts the construction of FIGS. 1-3, but provided with swivel connectors.

The illustrated hooks 17 and eyes 5 are but exemplary, and other connectors can be used to connect such holding belts or cables to the counterpressure pad 1, the illustrated means being only illustrative. For example, it is advantageous to replace the simple eyes 5 shown in FIG. 1 with swivel eyes, as shown in FIG. 6, in which case the belts or cables slung around the pipe 15, or the like, can position themselves optimally to match the surface curvature of the pipe during the tightening of the belts or cables.

In FIG. 1, two belts are employed, and to facilitate distinguishing between them during use they can be of different respective colors.

Figure 5:
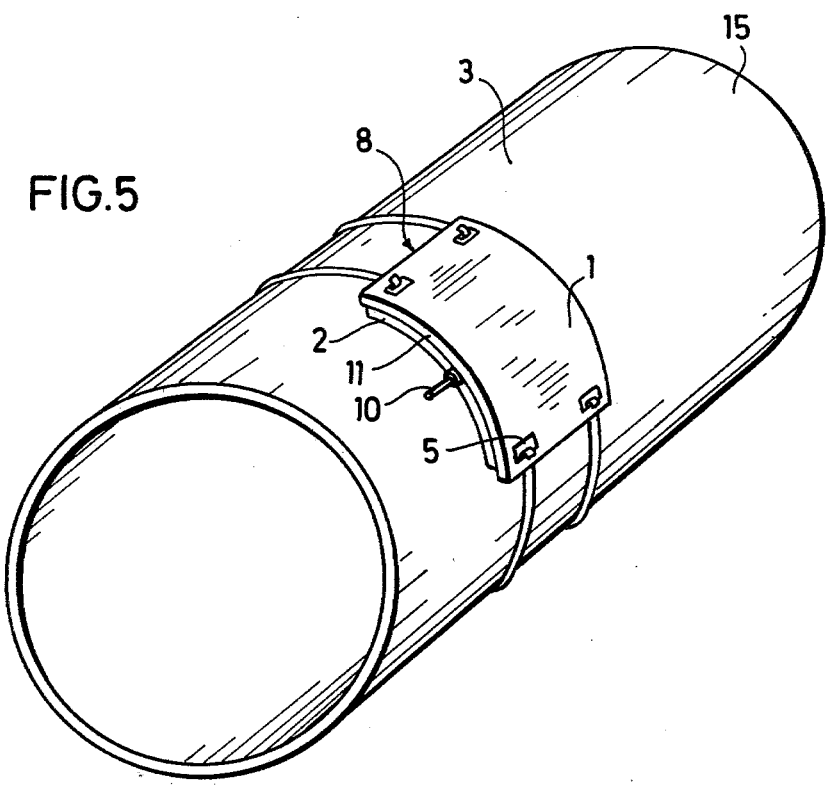
FIG. 5 depicts a modification of the sealing arrangement of FIGS. 1-3, but with the inflation valve thereof instead projecting out from the marginal portion of the inflatable pad of the sealing arrangement.

The location of the inflation valve 10 in FIG. 1 presupposes that the conduit supplying pressurized air for inflating the pad 2 can be brought into engagement with valve 10. However, it is alternatively contemplated that the inflation valve 10 not be located as in FIG. 1, but instead be provided on one of the narrow side walls of the inflatable pad 2 so as to extend generally parallel to the pads, as shown in FIG. 5; this makes for a flat structure free of projections which might create problems of installation in cramped spaces or problems of access when inflating the installed sealing arrangement.

With the sealing arrangement depicted in FIG. 1, it is possible to seal off pipes whose diameter is considerably smaller than that of the pipe 15 shown in FIG. 1. In that event, the sealing arrangement is wrapped around the small-diameter pipe in the manner of an inflatable cuff surrounding a large circumferential sector of the pipe. In this way, the illustrated sealing arrangement can be used to seal off breaks which extend around substantial circumferential sectors of the pipe, e.g., more than 180°.

The structure of the counterpressure pad 1 is shown in FIGS. 2 and 3. The counterpressure pad 1 is preferably made of rubber or the equivalent and is provided at the edge regions 4 provided with the eyes 5, with reinforcements. In FIG. 2, the reinforcement is an embedded or inserted flat bar of metal 6. In FIG. 3, the reinforcement 6 comprises a metal rod 9 of circular cross section around which rubber has been vulcanized. The counterpressure pad 1 furthermore contains steel filament cords 7 which are slung around the reinforcements 6 and extend generally perpendicular thereto. I.e., each individual steel cord 7 extends from one transverse reinforcement 6 to the other, slung about both of them.

The intermediate clearances between neighboring steel filament cords 7 are smaller than the diameters of the individual cords, as most clearly shown in FIG. 3, and the cords are slung about the reinforcements 6 so as to impart a bobby-pin-like configuration to the cords. The free ends of the steel cords 7 are cut off at distances from the reinforcement 6 where the two legs of each cord 7 extend generally parallel to each other. The edge reinforcements 6 and the steel cords 7 are then embedded in a rubber mass 16 which encapsulates the reinforcements and steel cords. Only in the region of an eye 5 can a naked part of the rod or bar 9 be exposed if desired, but it is advantageous to encase this part of the rod or bar with rubber as well.

The eyes 5 are provided in the edge regions 4 of the counterpressure pad 1 inward of the edge reinforcements 6. In this way, very high oulling forces can be applied to the eyes 5 without danger of breaking the eyes off.

The construction of the inflatable pad 2 is best seen in FIG. 2. The inflatable pad 2 comprises two rectangular walls 13, 14 of somewhat smaller dimensions than the counterpressure pad 1. Both walls 13, 14 are preferably reinforced by steel or another reinforcing material, so that when inflated the pad 2 will be able to bend but without losing its generally pad-like shape. The walls 13, 14 are bonded together at strip-like zones at their edges. The material of the inflatable pad 2 is preferably rubber, and the walls 13, 14 can be stripwise vulcanized together at their edge regions. The inflatable pad 2 shown in FIG. 2 is very robust and can, for example, withstand inflation pressures of 6 bar.

The inflatable pad 1 is fixedly secured to the counterpressure pad 2, in the embodiment of FIG. 2, e.g., by means of surface-to-surface vulcanization. This is particularly advantageous, because it assures that the inflatable pad 2 will always be properly located relative to the counterpressure pad 1 and cannot slip out of place or be forgotten when installing the illustrated sealing arrangement.

Instead of bonding the inflatable pad 2 to the counterpressure pad 1, the counterpressure pad 1 can actually constitute one wall of the inflatable pad 2, or equivalently be integral with one wall of the inflatable pad.

Advantageously, to facilitate installation and inflation in cramped spaces, the inflation valve 10 does not stick out through counterpressure pad 1 normal thereto, but instead extends out from one of the side walls of the inflatable pad 2. This may facilitates the attachment of a pressurized-air conduit to the inflation valve 10 after installation.

The rubber material 16 of the sealing arrangement is chemically resistant to a great variety of gases and liquids. In applications where dissolution of the rubber material might occur, it is contemplated to cover the pads 1 and 2 on both sides by a foil of suitably chemically resistant material, preferably by providing the chemically resistant foil in the form of an envelope 12, as shown in FIG. 4, into which the pads 1 and 2 can be inserted.

To seal off a break in a container whose wall is insufficiently even, the invention contemplates providing a soft rubber pad 18 (FIG. 2) intermediate the inflatable pad 2 and the leaking surface to be sealed. The pad 18 is preferably connectable to the inflatable pad 2 by a quick-release connection, e.g., using snap-action connectors or connectors made of Velcro. Preferably, the soft pad 18 is made of foamed material, e.g., foam or sponge rubber with closed-pore structure.

It will be understood that each of the elements described above, or two or more together, may also find a useful application in other types of constructions differing from the types described above.

While the invention has been illustrated and described as embodied in a sealing arrangement of particular design, it is not intended to be limited to the details shown, since various modifications and structural changes may be made without departing in any way from the spirit of the present invention.

Without further analysis, the foregoing will so fully reveal the gist of the present invention than others can, by applying current knowledge, readily adapt it for various applications without omitting features that from the standpoint of prior art, fairly constitute essential characteristics of the generic or specific aspects of this invention.

What is claimed as new and desired to be protected by Letters Patent is set forth in the appended claims.

1. In a sealing arrangement of the type which is laid against the leaking surface of a pipe, conduit, vessel or the like, in combination, an inflatable pad to be laid against the leaking surface to be sealed; and a flexible counterpressure pad joined to the inflatable pad at the side of the inflatable pad which faces away from the leaking surface to be sealed, the flexible counterpressure pad having edge regions provided with connectors to which can be connected holding belts or cables wrapped around such pipe or the like, whereby when the inflatable pad is laid against a leaking surface both the inflatable pad and also the counterpressure pad can conform to the leaking surface prior to inflation of the inflatable pad, the counterpressure pad having two spaced edge regions provided with reinforcements, the reinforcements extending transverse to the direction in which the counter-pressure pad tends to be stretched when held in place by holding belts or the like wrapped around a pipe or the like, and further including cords of reinforcing material accommodated within the material of the counterpressure pad extending transverse to the transverse reinforcements and slung around the transverse reinforcements.

2. The sealing arrangement defined in claim 1, the cords of reinforcing material being made of metal.

3. The sealing arrangement defined in claim 2, the counterpressure pad being rectangular and having two smaller sides, the transverse reinforcements being located in the region of and parallel to the smaller sides and comprising metal bars accommodated within the material of the flexible counterpressure pad.

4. The sealing arrangement defined in claim 1, the inflatable pad being a generally rectilinear and flat pad.

5. The sealing arrangement defined in claim 4, the inflatable pad and the counterpressure pad being joined together at their facing sides.

6. The sealing arrangement defined in claim 5, the inflatable pad being provided with an inflation valve, the counterpressure pad having an aperture, the inflation valve extending through the aperture and projecting out from the counterpressure pad.

7. The sealing arrangement defined in claim 5, the inflatable pad being provided with a marginal portion and an inflation valve located at the marginal portion of the inflatable pad and extending out from the inflatable pad generally parallel to the counterpressure pad.

8. The sealing arrangement defined in claim 4, the inflatable pad comprising two flat and parallel walls the first of which faces in use towards the surface to be sealed and the second of which faces away from the surface to be sealed, the counterpressure pad and the second wall of the inflatable pad being different portions of a single piece of material.

9. The sealing arrangement defined in claim 4, the inflatable pad comprising two flat and parallel wall elements made of reinforced rubber vulcanized together at their marginal regions.

10. The sealing arrangement defined in claim 2, furthermore including chemically resistant material enveloping the counterpressure and inflatable pads.

11. The sealing arrangement defined in claim 10, the enveloping chemically resistant material being provided in the form of an envelope of foil material into which the counterpressure and inflatable pads can be inserted.

12. The sealing arrangement defined in claim 2, the inflatable pad at the side thereof which is to face a leaking surface to be sealed being provided with a sealing pad made of foam rubber.

13. The sealing arrangement defined in claim 2, the clearance intermediate adjoining steel cords being smaller than the diameters of the individual steel cords.

14. The sealing arrangement defined in claim 2, the connectors being swivel connectors, whereby when the inflatable and counterpressure pads are laid into place and tightened belts or cables wrapped around a pipe or the like and connected to the connectors such belts or cables can swivel or rotate relative to the counterpressure pad to facilitate conforming of the pads to the surface to be sealed.

15. Sealing arrangement defined in claim 2, the connectors being in the form of apertures located inwardly of the transverse reinforcements, whereby when tightened belts or cables are connected to the connectors of the counterpressure pad the transverse reinforcements resist any tendency of the connectors to be pulled or broken off.

16. The sealing arrangement defined in claim 15, the connectors comprising apertured sections of the counterpressure pad located inwardly of the transverse reinforcements for receiving hooks on the ends of holding belts or the like.

* * * * *